United States Patent Office 3,560,247
Patented Feb. 2, 1971

3,560,247
POLYOLEFIN FILM OR NON-WOVEN FABRIC COATED WITH REMOISTENABLE ADHESIVE
William David Robinson, Wilmington, Del., assignor to E. I. du Pont de Nemours and Company, Wilmington, Del.
No Drawing. Filed Nov. 1, 1967, Ser. No. 679,607
Int. Cl. B44d 1/14; C09j 7/02
U.S. Cl. 117—76                                     7 Claims

ABSTRACT OF THE DISCLOSURE

A polyolefin film or non-woven fabric, particularly of polypropylene, having a top coating of a remoistenable adhesive such as partially hydrolyzed polyvinyl alcohol is firmly anchored to the film or fabric through a plasticized coating of a vinyl acetate/dibutyl maleate copolymer or a vinyl acetate/ethylene/unsaturated monocarboxylic acid terpolymer.

BACKGROUND OF THE INVENTION

Polyvinyl alcohol has long been used for the manufacture of non-woven ribbon. In the process, rayon or rayon acetate yarn is wetted with an aqueous polyvinyl alcohol solution, the strands of yarn are brought into intimate contact and, upon drying, the yarn is bonded into a continuous non-woven ribbon. The ribbon is used for gift wrapping and fabrication of decorative ribbon bows. One of the features of this type ribbon has been its "lick-and-stick" property, which is imparted by the water sensitivity of the polyvinyl alcohol. The water-remoistenable coating of polyvinyl alcohol allows bonding of the ribbon to itself or paper surface. An extruded or non-woven ribbon of polypropylene is desirable for this end use, but it does not have the needed "lick-and-stick" property. It has proved difficult to confer "lick-and-stick" properties to polypropylene ribbon by applying a coating of a partially hydrolyzed polyvinyl alcohol from an aqueous solution. The solution does not wet the ribbon surface adequately, and, in addition, the coating does not adhere well to the ribbon. Thus, a base coating which will wet the polypropylene ribbon and bond itself to the ribbon is needed.

SUMMARY OF INVENTION

According to the present invention there is provided an article comprising a polyolefin film or non-woven fabric having thereon a first coating of plasticized vinyl acetate/dibutyl maleate copolymer consisting of 60 to 90% vinyl acetate and 40 to 10% dibutyl maleate or a vinyl acetate/ethylene copolymer which may contain copolymerized unsaturated monocarboxylic acid and consisting of 55 to 96% vinyl acetate, 4 to 40% ethylene and 0 to 5% unsaturated monocarboxylic acid and a top coating of a remoistenable adhesive. This article is prepared by the process which comprises adding a plasticizer to a vinyl acetate/dibutyl maleate copolymer emulsion wherein the copolymer consists of 60 to 90% vinyl acetate and 40 to 10% dibutyl maleate or to a vinyl acetate/ethylene copolymer emulsion consisting of 55 to 96% vinyl acetate, 4 to 40% ethylene and 0 to 5% unsaturated monocarboxylic acid; coating the plasticized copolymer emulsion onto a surface of the polyolefin film or fabric; drying the copolymer emulsion coating; and applying a remoistenable adhesive coating to the dried, plasticized copolymer.

DETAILED DESCRIPTION OF INVENTION

There are three components to the article of the present invention—(1) a polyolefin film or non-woven fabric, (2) a plasticized vinyl acetate/dibutyl maleate copolymer or vinyl acetate/ethylene copolymer adhesive anchor coating, and (3) a top coating of a remoistenable adhesive which is non-blocking.

Polyolefin films or non-woven fabrics are prepared as known in the art and are available commercially. A polypropylene film or non-woven fabric is particularly preferred.

The vinyl acetate/dibutyl maleate copolymer adhesive coating or the vinyl acetate/ethylene copolymer adhesive coating can be prepared by plasticizing the copolymeric emulsion with a suitable plasticizer. The adhesive is then applied to the surface of the polyolefin film or non-woven fabric and the coating dried. The vinyl acetate/dibutyl maleate copolymeric emulsion comprises about 40 to 60% solids of the copolymer consisting of 60 to 90% vinyl acetate and 40 to 10% dibutyl maleate and from 5 to 35% by weight, preferably 5 to 15% by weight, based on the emulsion weight of a plasticizer. A particularly preferred emulsion is an aqueous dispersion of a 60% vinyl acetate/40% dibutyl maleate copolymer having a predominant particle size of less than 0.5 micron. It has a minimum non-volatile content of 55% and can contain surfactants, coalescing agents and protective colloids such as hydroxyethylcellulose.

The vinyl acetate/ethylene copolymeric emulsion comprises about 40 to 60% solids of the copolymer consisting of 55 to 96% vinyl acetate, 4 to 40% ethylene and 0 to 4% unsaturated monocarboxylic acid and from 5 to 35% by weight, preferably 5 to 15% by weight, based on the emulsion weight of a plasticizer. A preferred copolymeric emulsion is an aqueous dispersion of 88% vinyl acetate, 11% ethylene and 1% acrylic acid. Other suitable acids include methacrylic acid and crotonic acid.

While the type of plasticizer is not critical, preferred plasticizers are glycerin triacetate, N-ethyl-o- and p-toluene sulfonamide and an isobutyl derivative of phthalic acid and 2-2-4 trimethyl pentanediol isobutyrate. Other typical plasticizers compatible with polyvinyl acetate include phthalate esters such as dibutyl phthalate and diisobutyl phthalate, polyesters, tricresyl phosphate, butyl phthalyl butyl glycolate, diethylene glycol dibenzoate, an ethylene glycol/adipic acid reaction product and many others known in the art. Generally, the plasticizer level will increase with an increase in vinyl acetate content in the copolymer, e.g., it will be necessary for a copolymer of 85% vinyl acetate and 15% dibutyl maleate to have a plasticizer level of about 20 to 25%.

To aid in the wetting of the polyolefin film or fabric, 3 to 10% by weight of an organic solvent such as toluene, trichlorethylene, carbon tetrachloride, xylene, benzene and ethyl acetate can be added to the emulsion. Usually, aqueous systems are preferred because of reduced fire hazards; however, the anchor coat can be applied from an organic solvent solution of the copolymer as long as the anchor coat exhibits adhesion to both the polyolefin and remoistenable adhesive films.

The anchor coating composition can be applied to the polyolefin by any of a number of conventional techniques such as by brush, doctor blade, draw-down bar or spirally wound wire rod or roll coating device.

Drying of the anchor coating can be accomplished at any convenient temperature as long as the tacky nature of the coating is maintained and does not cause objectionable softening or distortion of the film or fabric or coating thereon. While drying at room temperature is preferred, any temperature up to about 95° C. can be used.

The remoistenable adhesive top coat can be any one of many known adhesives. For example, there can be used dextrin, other types of converted starch, and animal glue; however, the preferred adhesive is polyvinyl alcohol which can either be partially acetylated, hydroxyethylated or cyanoethylated polyvinyl alcohol. Also, the partially hydrolyzed olefin modified polyvinyl alcohols can be used, as can mixtures of water-redispersible types of polyvinyl acetate emulsions with cold water soluble polyvinyl alcohols and/or starch and dextrin.

A particularly preferred remoistenable adhesive is a cold water soluble partially acetylated polyvinyl alcohol which has a saponification number of about 125–145, which is equivalent to about 87–89 mole percent hydrolysis. The viscosity of a 4% aqueous solution is about 35–45 centipoises at 20° C. Generally, any cold water soluble polyvinyl alcohol having a degree of hydrolysis of about 70–95% and a 4% aqueous solution viscosity of about 3 to about 85 centipoises at 20° C. can be used.

While the remoistenable adhesive can be applied by any conventional technique, it is preferred to apply the polyvinyl alcohol coating from an aqueous solution which is then dried, preferably at room temperature. However, the polyvinyl alcohol or its derivative can also be applied from a hot melt.

The invention will be further illustrated by the following examples in which parts and percentages are by weight unless otherwise indicated.

EXAMPLE 1

One hundred parts by weight of a 55% solids copolymer emulsion of 60% vinyl acetate and 40% dibutyl maleate is modified by the addition of 15 parts by weight of "Santicizer" 8 (N-ethyl-o- and p-toluene sulfonamide), which is added to the emulsion while stirring, and mixing is continued for 30 minutes. This adhesive mixture is brushed on an extruded ribbon of polypropylene and dried at room temperature. The resulting tacky, pressure-sensitive adhesive coating has good adhesion to the ribbon.

A ten weight percent solution of polyvinyl alcohol of 87–89 mole percent hydrolysis in water, containing 0.1% "Triton" X–100 (alkylaryl polyether alcohol) as a wetting agent, is prepared. This is accomplished by slurrying the polyvinyl alcohol in cool water (less than 35° C.) and then with continued stirring completing the solution in a water bath at 85–95° C.

The solution is applied by brush to the surface of the dry, tacky coating on the polypropylene ribbon. After drying at room temperature, the coating is found to have good adhesion to the tacky, vinyl acetate copolymer anchor coat. Adhesion of the top coat is considered satisfactory (good) if the coating is not lifted or disrupted by the adhesive test. In this test, a pressure-sensitive cellophane tape is pressed against the coated surface, then removed with a quick pull.

EXAMPLE 2

Example 1 is repeated except 10 parts by weight of an isobutyl derivative of phthalic acid and 2,2,4-trimethyl pentanediol is added to the vinyl acetate/dibutyl maleate copolymer emulsion as plasticizer. The adhesion of the polyvinyl alcohol top coat is good when subjected to the adhesive tape test.

EXAMPLE 3

Example 1 is repeated except 8 parts by weight of triacetin (glycerin triacetate) is added to the vinyl acetate/ dibutyl maleate copolymer emulsion as plasticizer. The polyvinyl alcohol top coat is firmly adhered to the copolymer anchor coat.

EXAMPLE 4

Example 1 is repeated except 5 parts by weight of toluene is added to the vinyl acetate/dibutyl maleate copolymer emulsion to further aid in the wetting of the polypropylene ribbon. The adhesion of the polyvinyl alcohol top coat is good when subjected to the adhesive tape test.

EXAMPLE 5

An anchor coating composition is prepared as in Example 1 and comprises 100 parts by weight of a 55% solids copolymer emulsion of 60% vinyl acetate and 40% dibutyl maleate, 11 parts by weight of "Santicizer" 8 and 5 parts by weight of toluene. The coating is applied to polypropylene ribbon and dried. The dry, tacky coating has good adhesion to the ribbon.

A sample of the anchor-coated ribbon is coated with a 25 weight percent solution of dextrin in water containing 0.1 weight percent of "Triton" X–100 as wetting agent and then dried at room temperature. The dextrin coating has good adhesion to the anchor coat and has remoistenable adhesive properties to itself or a paper surface.

Another sample of the anchor-coated ribbon is coated with a 10 weight percent solution of carboxymethylcellulose in water and dried at room temperature. The carboxymethylcellulose has good adhesion to the anchor coat and has remoistenable adhesive properties.

EXAMPLE 6

To 100 parts by weight of a 55% solids terpolymer emulsion of 88% vinyl acetate, 11% ethylene and 1% acrylic acid is added 5 parts of "Santicizer" 8 plasticizer as in Example 1 and coated on a polypropylene ribbon as in Example 1. The dry, tacky coating has good adhesion to the ribbon. The remoistenable adhesive polyvinyl alcohol top coating is applied and dried as in Example 1. Adhesion to the anchor coat is good as demonstrated by the pressure-sensitive cellophane tape test.

EXAMPLE 7

Following the procedure of Example 1, 25 parts by weight of "Santicizer" 8 plasticizer is added to 100 parts of a 55% solids copolymer emulsion of 85% vinyl acetate and 15% dibutyl maleate. This composition is applied to polypropylene ribbon and dried at room temperature. A top coating of polyvinyl alcohol is applied to the anchor coating and dried at room temperature. The top coating has good adhesion to the anchor coat when subjected to the pressure-sensitive cellophane tape test.

What is claimed is:

1. An article comprising a polyolefin film having thereon an anchor coating of plasticized vinyl acetate/dibutyl maleate copolymer consisting of 60 to 90% vinyl acetate and 40 to 10% dibutyl maleate or a plasticized vinyl acetate/ethylene copolymer consisting of 55 to 96% vinyl acetate, 4 to 40% ethylene and up to 5% copolymerized unsaturated monocarboxylic acid and a top coating of a remoistenable adhesive.

2. The article of claim 1 wherein the anchor coating is a plasticized copolymer of 60% vinyl acetate and 40% dibutyl maleate.

3. The article of claim 1 wherein the remoistenable adhesive top coating is polyvinyl alcohol of 70–95% degree of hydrolysis.

4. The article of claim 2 wherein the remoistenable adhesive top coating is polyvinyl alcohol of 70–95% degree of hydrolysis.

5. The article of claim 1 wherein the polyolefin film is a polypropylene film.

6. The article of claim 1 wherein the anchor coating is a plasticized terpolymer of 88% vinyl acetate, 11% ethylene and 1% acrylic acid.

7. The article of claim 1 wherein the polyolefin film is a polyethylene film.

References Cited

UNITED STATES PATENTS

| | | | |
|---|---|---|---|
| 2,220,987 | 11/1940 | Bauer et al. | 117—122X |
| 2,443,889 | 6/1948 | Bruce et al. | 117—122X |
| 2,666,718 | 1/1954 | Davis | 117—122 |
| 3,028,259 | 4/1962 | Webber | 117—76 |
| 3,218,189 | 11/1965 | Tyler | 117—138.8X |
| 3,285,764 | 11/1966 | Nelson | 117—122X |

WILLIAM D. MARTIN, Primary Examiner

B. D. PIANALTO, Assistant Examiner

U.S. Cl. X.R.

117—122, 138.8, 161